(12) United States Patent
Bajpay et al.

(10) Patent No.: US 7,570,580 B1
(45) Date of Patent: Aug. 4, 2009

(54) AUTOMATIC PROBLEM ISOLATION FOR MULTI-LAYER NETWORK FAILURES

(75) Inventors: Paritosh Bajpay, Edison, NJ (US); Carolyn Bekampis, Wayside, NJ (US); Hossein Eslambolchi, Los Altos Hills, CA (US); Wen-Jui Li, Middletown, NJ (US); David Lu, Morganville, NJ (US); John McCanuel, Bailey, CO (US)

(73) Assignee: AT&T Corp., New York, NY (US)

( * ) Notice: Subject to any disclaimer, the term of this patent is extended or adjusted under 35 U.S.C. 154(b) by 654 days.

(21) Appl. No.: 11/292,276

(22) Filed: Dec. 2, 2005

(51) Int. Cl.
*H04L 1/00* (2006.01)
(52) U.S. Cl. .................................. 370/216; 709/224
(58) Field of Classification Search ................. 370/216; 709/224
See application file for complete search history.

(56) References Cited

U.S. PATENT DOCUMENTS

| | | | |
|---|---|---|---|
| 6,359,909 B1 * | 3/2002 | Ito et al. ..................... | 370/522 |
| 6,424,629 B1 * | 7/2002 | Rubino et al. ............. | 370/241.1 |
| 6,952,659 B2 | 10/2005 | King et al. | |
| 7,082,099 B2 * | 7/2006 | Ueno et al. ................. | 370/216 |
| 7,380,017 B2 * | 5/2008 | Weil et al. ................... | 709/239 |
| 2003/0039208 A1 * | 2/2003 | Soumiya ..................... | 370/216 |
| 2003/0147346 A1 * | 8/2003 | Kanakubo ................... | 370/227 |
| 2004/0090913 A1 * | 5/2004 | Scudder et al. ............ | 370/219 |
| 2005/0144505 A1 * | 6/2005 | Takeuchi et al. ............ | 714/4 |
| 2006/0045005 A1 * | 3/2006 | Blackmore et al. ......... | 370/216 |

OTHER PUBLICATIONS

Cisco—Using OAM for PVC Management. Document ID: 10480. [online], [retrieved on Nov. 29, 2005]. Retrieved from the Internet <URL: http://www.cisco.com/warp/public/121/oam.html.

* cited by examiner

*Primary Examiner*—Andrew Lee

(57) ABSTRACT

A method and apparatus includes automatically correlating indicators already generated by network components to detect and isolate failures that are caused by or related to network components operating on different layers of the open system interconnect (OSI) model. Failure indicators that persist for longer than a specified time window are automatically detected and correlated with one another based on a topology table. The method uses indicators already generated by the network components, obviating the need for software that typically resides on and consumes valuable processing time of network components.

17 Claims, 4 Drawing Sheets

US 7,570,580 B1

AUTOMATIC PROBLEM ISOLATION FOR MULTI-LAYER NETWORK FAILURES

FIELD OF INVENTION

The invention relates generally to computer network problem detection and, more particularly, to a method and apparatus for automatically isolating and detecting problems on different layers of a network.

BACKGROUND

Balancing network resources between maintenance and network functionality is key to the efficient, reliable, and cost-effective administration of a network. Network administrators often decrease network resources to minimize network costs, but this creates a tension between the use of network resources for detection and isolation of network problems and the use of network resources for network functionality. When network resources are allocated to automatic problem detection and isolation, network resources are unavoidably diverted away from the processing of network traffic, resulting in degraded network performance. If more resources are allocated to network functionality, network problems may go undetected and reactive manual troubleshooting can result in long delays and increased network downtime.

A technique for balancing network resources between the detection and isolation of network problems and network functionality is the leveraging of indicators that are already generated by network components. Network components generate a variety of indicators such as connection indicators transmitted between network components to establish a network connection, alarm indicators indicating a problem, or status indicators indicating the status of a component. These indicators can be collected from components dedicated to the processing of network traffic, such as routers and switches, and processed on components with resources less vital to basic network functionality. This cost-effective technique uses indicators already generated by network components to accomplish automatic problem isolation and detection without diverting resources away from network components intended to execute basic network functionality.

By monitoring indicators already generated by network components, typical operations, administration, and maintenance software, or similar software, which consumes the valuable processing resources of network equipment such as routers and switches, can be disabled. Operations, administration, and maintenance software is capable of detecting problems within and between layers of network components within the open system interconnect (OSI) model, but this detection and isolation capability is employed at the expense of network performance. Monitoring indicators from network components is also advantageous over manual detection and isolation of network problems which is often slow. Because manual detection and isolation is time consuming, network users are severely impacted by increased network downtime.

Although the process of monitoring indicators already generated by network components has many advantages over other detection and isolation methods, the process cannot be used to detect and isolate problems that occur between or are caused by components on different layers of the OSI model. Currently, the only solutions to problems related to or caused by a component on another layer of the network are manual detection and isolation or the use of software such as operations, administration, and maintenance software. Thus, there is a need for a method and apparatus that automatically correlate indicators already generated by network components to detect and isolate failures that are caused by or related to network components operating on different layers of the OSI model.

SUMMARY OF THE INVENTION

A method and apparatus includes automatically correlating indicators already generated by network components to detect and isolate failures that are caused by or related to network components operating on different layers of the OSI model. Failures that persist for longer than a specified time window are automatically detected and correlated with one another based on a topology table. The method uses indicators already generated by the network components, obviating the need for software that typically resides on and consumes valuable processing time of network components.

DETAILED DESCRIPTION

A method and apparatus includes automatically correlating indicators already generated by network components to detect and isolate failures that are caused by or related to network components operating on different layers of the OSI model. Failure indicators that persist for longer than a specified time window are automatically detected and correlated with one another based on a topology table. The method uses indicators already generated by the network components, obviating the need for software that typically resides on and consumes valuable processing time of network components.

Figure 1:
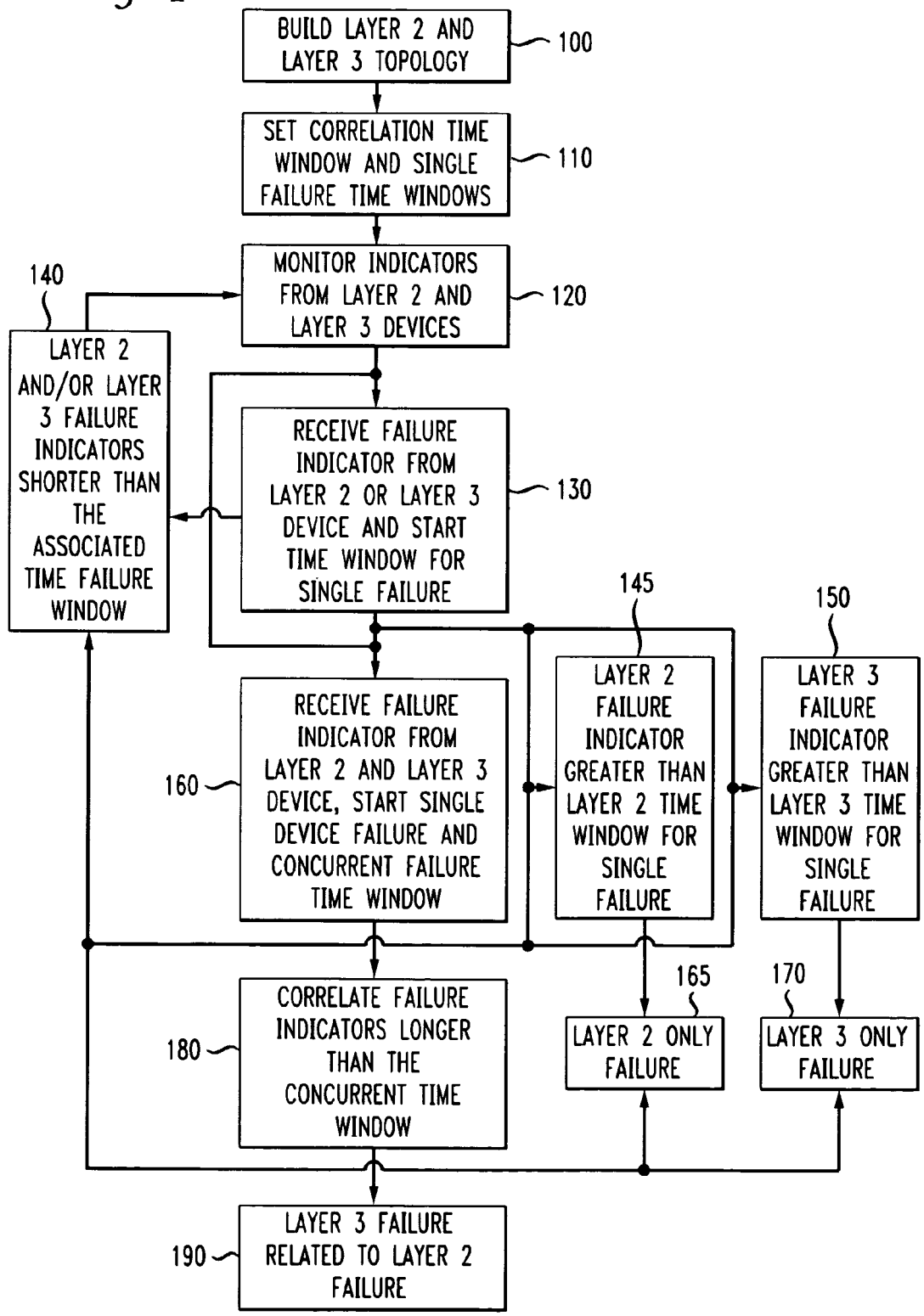
FIG. 1 is a flowchart illustrating the automatic detection and isolation of network problems according to an embodiment of the invention.

FIG. 1 is a flowchart that illustrates the detection and correlation of layer 2 to layer 3 failure indicators to detect a layer 3 device failure that is longer in duration than a specified correlation time window and is related to a layer 2 device failure. Although the embodiment in the flowchart uses layer 2 and layer 3 devices, the method could be applied to any two layers of the OSI model including components on layers that are not adjacent to one another. Also, this flowchart can be applied to any number of network problems that occur between network layers such as, for example, a faulty permanent virtual circuit between layer 2 and layer 3 devices.

Devices generate a variety of indicators such as connection indicators transmitted between network components to establish a network connection, failure indicators indicating a problem, or status indicators indicating the status of a component. In this embodiment, all indicators are collected, but only failure indicators indicating that a device is down or failing are used for correlation. Also, failure indicators received from devices can, but do not necessarily need to correspond with the duration of a device failure. For example, a device could fail, but the failure indicator may not be sent immediately. Likewise, after a device has returned to a normal or up state, one or more failure indicators may be still be communicated before an indicator indicating an up state is sent or before one or more failure indicators are turned off.

Before the correlation of failure indicators can be accomplished, a table that contains the topology of the layer 2 and layer 3 devices is created, 100. The topology table, which contains information that indicates how various components within a network are connected to one another, is used to link a layer 3 device failure to a layer 2 device failure. For example, if a layer 3 device and layer 2 device both fail or are down for overlapping time periods for unrelated reasons on different physical areas of a network, a topology table could be used to determine that the two devices, or their associated failure indicators, are unrelated. Since the layer 3 device is malfunctioning, it may not be capable of determining whether the failing layer 2 network device is related to the layer 3 failure or may not be capable of determining that the layer 2 device is not functioning properly. Likewise, the layer 2 device may also have difficulty determining and may not be programmed to detect that it is not the cause of the layer 3 device failure. A topology table would show that the two devices are unrelated because, for example, they reside on different areas within the network.

Before the correlation of failure indicators can be accomplished, a correlation time window is set 110. In this embodiment, a layer 3 device failure is only reported as a failure related to a layer 2 device failure if the concurrent duration of failure indicators from the layer 2 device and layer 3 device are longer in duration than the correlation time window. One reason for setting a correlation time window is to avoid reporting a false failure. Failure indicators are frequently sent from layer 2 and layer 3 devices, but many of the failure indicators may indicate only temporary interruptions and may not indicate hard device or logic failures. Failure indicators may also be sent from only one device rather than from both devices. For example a layer 3 device may send a failure indicator because it is experiencing difficulty in contacting a neighboring router because the neighboring router is momentarily busy. At the same time, a related layer 2 switch may send a failure indicator for a similar temporary interruption. If reporting only concurrent hard failures, the immediate correlation and reporting of the temporary layer 3 device failure indicator and concurrent layer 2 device failure indicator would result in a false alarm. To avoid this situation, the layer 2 and layer 3 device failures are only reported if both devices are failing at the same time for longer than the specified correlation time window.

The length of the correlation time window can be varied depending upon the equipment and requirements of the network devices being monitored. For example, if a certain type of router normally experiences long periods of interruption and the network is not adversely affected by longer periods of interruption, the time window can be increased to avoid detecting and sending an alarm for this type of normal network behavior. If on the other hand, users of a network cannot tolerate more than a few seconds of down time and the devices within the network rarely fail for more than a few seconds, the length of the correlation time window can be set to detect failure indicators that last slightly longer than a few a seconds. In some embodiments, the time window can be varied depending on the type of failure being monitored. For example, a certain type of failure may be accurately assessed in a short amount of time. In this case, the correlation time window could be set to quickly detect the specific failure mode.

In some embodiments, a single failure time window can also be set for a layer 3 device failing alone or a layer 2 device failing alone. The single failure time window could be the same for both the layer 2 and layer 3 devices or could be set separately for each device. This single failure time window, like the correlation time window, depends on the requirements of the network and/or user and could also depend specifically on the capabilities and characteristics of the layer 2 or layer 3 devices or the specific type of failure. In this embodiment, single failure time windows are set for both layer 2 only failures and layer 3 only failures.

After the topology table and the time windows are set, indicators from the layer 2 and layer 3 devices are monitored continuously, 120. During typical network operations a multiplicity of indicators such as status, connection, or failure indicators are transmitted by the layer 2 and layer 3 devices. Any type of failure indicator can be monitored. Alternatively, the indicators can be filtered to detect only a certain type of failure, connection, or status indicator. Even after a failure indicator is received from a layer 2 or layer 3 device, indicators, including normal indicators, continue to be monitored to detect situations such as a concurrently failing device on a different layer, a new failure on the same layer, or restored functionality. The possible scenarios after a failure indicator is received are described below.

In the simplest case, a single layer 2 or single layer 3 device failure indicator is received and a timer for the single device failure is started 130, but the duration of the failure indicator is less than the time window for the single device and no other failure indicator is received, 140. Because the duration is less than the time window, no failure is reported. For example, if a failure indicator is received indicating that a layer 3 device is unable to communicate with other devices, a time window for the layer 3 device is started. If an indicator indicating that the layer 3 device has returned to full functionality (i.e. returned to an up state) is received before the time window expires and before any other failure indicators are received, the timer for the single device failure is stopped and layer 2 and layer 3 device indicators continue to be monitored.

If a single device failure indicator is received and the duration of the failure indicator is greater than the prescribed duration of the time window without receipt of a failure indicator for another device, a single device failure is reported. If only a layer 2 device failure indicator is received without receiving a layer 3 device failure indicator, a timer for the layer 2 device time window is started, 130. If the duration of the layer 2 device failure indicator is greater than the layer 2 device time window 145, then a layer 2 only failure 165 is reported. Likewise, if only a layer 3 device failure indicator is received without receiving a layer 2 device failure indicator, a timer for the layer 3 device time window is started, 130. If the duration of the layer 3 device failure indicator is greater than the layer 3 device time window 150, then a layer 3 only failure 170 is reported. Although the flowchart illustrates that single device failures are monitored and reported, in alternative embodiments, it is not necessary that all or any one of the single devices failures be monitored and/or reported.

In another set of scenarios, a first device from a first network layer sends a failure indicator and later, a second device from a second network layer sends a second failure indicator. For example, if a layer 2 device failure indicator is received first, the layer 2 device failure time window is started, 130. When a layer 3 device failure indicator is later received, the layer 3 device failure time window and the concurrent failure time window are started, 160. At this point, all failure window timers are running because both the layer 2 and layer 3 devices indicated as having failed. This point could also be reached if the layer 3 device failure indicator is first received and the layer 2 device failure indicator is later received or if failure indicators from the layer 2 device and layer 3 device are received simultaneously, 160. When all failure window timers are running because both the layer 2 and layer 3 devices are down, 160, several resulting situations are possible. First, both the layer 2 and layer 3 devices could return to an up state (i.e., no failure). Second, the layer 2 device only could return to an up state, the layer 3 device only could return to an up state, or both the layer 2 and layer 3 devices can continue to indicate a failure or remain in a down state.

If both the layer 2 and layer 3 devices return to an up state before the concurrent time window expires or before either of the associated single device respective failure time windows of the layer 2 or layer 3 expire, 140, then no failure is reported. If the layer 3 device only returns to an up state before its time failure window expires, 140, but the duration of the indicated failure of the layer 2 device exceeds the layer 2 failure time window, 145, a layer 2 only failure, 165 is reported. Conversely, if the layer 2 device only returns to an up state before its time failure window expires, 140, but the duration of the failure of the layer 3 device exceeds the layer 3 failure time window, 150, a layer 3 only failure, 170 is reported.

If the duration of the concurrent layer 2 and layer 3 device failure indicators or down state is longer than the concurrent time window, the layer 2 device failure indicator and layer 3 device failure indicator are correlated, 180 using a topology table to determine if the layer 3 failure is a result of the layer 2 device failure. If the layer 2 and layer 3 device failure indicators are correlated through the topology table, the failure is reported as a layer 3 device failure related to the layer 2 device failure, 190. Depending upon the failure indicators detected, the failures could be associated with a cause and effect, but do not necessarily have to be classified as being associated with a cause and effect.

If the layer 2 and layer 3 device failure indicators are not correlated, the durations of the layer 2 and layer 3 device failure indicators are compared with their associated single device time windows and are reported as failures if they exceed their associated single device failure time windows. If the layer 2 and/or layer 3 device returns to an up state before the respective failure time window expires, 140, the layer 2 and/or layer 3 device failure is not reported.

After a concurrent or single device failure is reported, the failure can be tracked so that even if a failure indicator is continually received, the failure report will not be duplicated or will be appropriately associated with subsequent failure indicators. If a concurrent layer 2 and layer 3 failure is reported, for example, subsequent concurrent failures of the same type may not be reported to avoid duplicating the reporting of the concurrent failure.

In some embodiments, the correlation of layer 2 and layer 3 devices could occur at different points in time. For example, the correlation of layer 2 and layer 3 devices could occur directly after failure indicators are received from both the layer 2 and layer 3 devices rather than after the concurrent failure window timer has expired. This would avoid the starting of a concurrent failure window timer if the layer 2 and layer 3 devices are unrelated. Also, this embodiment does not encompass all of the possible combinations of failure indicators that could be correlated to generate a failure report. Multiple failure indicators could be received from one or more devices on different layers and failures could be reported based on a variety of combinations of failure indicators from different devices. For example, failure indicators from more than two layers could be correlated with one another. In an alternative embodiment, a concurrent failure may be reported only when a selected failure occurs on a device on a first network layer and a combination of two specific failure indicators occurs on a device on a second layer.

Figure 2:
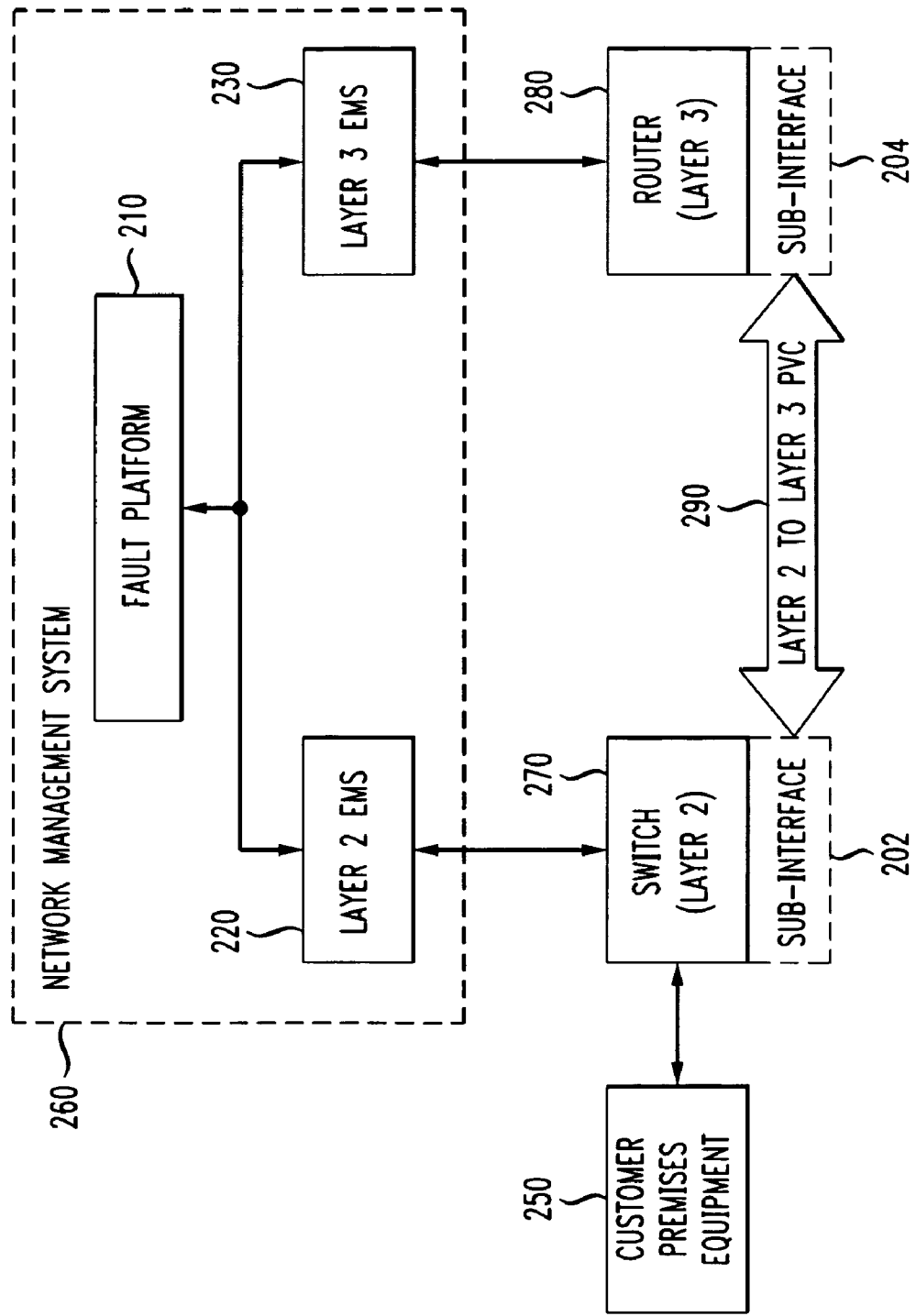
FIG. 2 is a functional block diagram of a system according to an embodiment of the invention.

FIG. 2 is an example of an embodiment of a network management system 260 monitoring indicators from a layer 2 switch 270 and a layer 3 router 280. The switch 270 and the router 280 communicate through the layer 2 to layer 3 permanent virtual circuit (PVC) 290 that is implemented on layer 2 through the switch 270. The layer 2 to layer 3 PVC 290 interfaces with the switch 270 and the router 280 via sub-interfaces 272 and 274, respectively. In this embodiment, the network management system 260 collects all indicators including failure indicators from the switch 270 and router 280 to determine if a failure by router 280 is caused by a layer 2 to layer 3 PVC 290 failure. Also, in this embodiment, only router 280 failure indicators or concurrent failure indicators are detected and reported and individual failure indicators related to switch 270 are ignored because only router 280 failures will adversely affect network traffic. Also, in this embodiment, switch 270 and router 280 are described as distinct devices, but the switch 270 and router 280 could be integrated into a single device such as a router processor module (RPM).

The network management system 260, which monitors and correlates indicators in this embodiment, includes a layer 2 element management system (EMS) 220, a layer 3 EMS 230, and a fault platform 210. The layer 2 EMS 220 collects indicators generated by the switch 270 and communicates the indicators to the fault platform 210. The layer 3 EMS 230 collects indicators from the router 280 and communicates the indicators to the fault platform 210. In this embodiment, the layer 2 EMS 220 and the layer 3 EMS 230 collect and correlate indicators from multiple layer 3 routers and layer 2 switches. In alternative embodiments, the network management system 260 could be a single integrated network device or a collection of multiple different network elements that together accomplish the same functionality as the network management system 260.

During network operations, switch 270 and router 280 constantly communicate one or more network related indicators including communication, instructions, and alarms. In this embodiment, however, the network management system 260 is configured to specifically filter for a border gateway protocol (BGP) down failure indicator from router 280 and a sub-interface failure indicator from switch 270. The BGP down failure indicator from router 280 indicates that router 280 is down for BGP errors. The sub-interface failure indicator from switch 270 indicates that the switch 270 is unable to communicate with the router 280 via the layer 2 to layer 3 PVC 290 because the layer 2 to layer 3 PVC sub-interface 272 on switch 270 is down. In this embodiment, the layer 2 to layer 3 PVC sub-interface 272 failure on switch 270 causes router 280 to fail, which will result in a BGP error that will be reported by router 280 in a BGP down failure indicator. Router 280 can also fail and report a BGP down failure indicator that is unrelated to a failure indicator on switch 270.

Although the BGP failure indicator communicated by router 280 contains information indicating the internet protocol (IP) address and status of the router 280 as down, the individual BGP failure indicator from router 280 does not indicate if a layer 2 to layer 3 PVC failure is causing the failure on router 280. Likewise, a sub-interface failure indicator from switch 270 indicates the sub-interface number of the layer 2 to layer 3 PVC sub-interface 272 and the status of the layer 2 to layer 3 PVC sub-interface 272 as down, but does not indicate if the layer 2 to layer 3 PVC sub-interface 272 failure on switch 270 is causing the failure on router 280. Furthermore, since the operations, administration, and management software is not available, this software cannot be used to determine and isolate the failures. The router 280 will not be able to detect a layer 2 to layer 3 PVC sub-interface 272 failure on switch 270 and the switch 270 will not be able to detect a router 280 BGP failure. A correlation of the BGP failure indicator and the sub-interface failure indicator on the network management system 260 is necessary to determine if the layer 2 to layer 3 PVC sub-interface 272 failure on switch 270 is causing the router 280 BGP failure.

In this embodiment, the IP addresses of all routers and the layer 2 to layer 3 PVC sub-interface numbers of all switches on a network are linked in a topology table. Since the IP address of a router is contained in the BGP failure indicator and the layer 2 to layer 3 PVC sub-interface number is contained in the sub-interface failure indicator, a router sending a BGP failure indicator and a switch sending a sub-interface failure indicator can be linked using the topology table. If a BGP failure indicator and a sub-interface failure indicator are received and the IP address of the router 280 and the layer 2 to layer 3 PVC sub-interface number from switch 270 are matched in the topology table, the router 280 failure and PVC failure on switch 270 are isolated and linked as having a cause and effect relationship. If the layer 2 to layer 3 PVC sub-interface number and router IP address do not match in the topology table, then the failures are communicated as unrelated. Table 1, below, is an example of a topology table that shows router IP addresses associated with sub-interface numbers on separate rows.

| Router IP address | Layer 2 to layer 3 PVC sub-interface number |
|---|---|
| 192.168.1.5 | 246432 |
| 192.168.6.10 | 234634 |
| 192.168.8.25 | 432514 |

The concurrent time failure window in this embodiment is sixty seconds and is started only for a concurrent BGP down and sub-interface down scenario. A fifty second layer 3 time window is also specified as a threshold duration for the BGP down failure indicator. If only a BGP down failure indicator is received without receiving a sub-interface down failure indicator and the duration of the BGP down failure indicator is greater than the layer 3 device time window, a router 280 BGP only failure will be reported. If the BGP down and sub-interface failure indicators are concurrently longer than the concurrent time window and the two failure indicators are correlated using the topology table, a router 280 failure caused by a failure of the layer 2 to layer 3 PVC sub-interface 272 on switch 270 will be reported. However, if only a sub-interface down failure indicator is received without receiving a BGP down failure indicator, no failure is reported. In all possible scenarios, the reporting of a concurrent layer 2 to layer 3 PVC failure on switch 270 and router 280 BGP failure will preempt the reporting of a router 280 only device failure. The concurrent failure is preemptively reported to avoid unnecessarily reporting a router 280 only device failure that is already accounted for in the concurrent failure.

Assuming that the switch 270 and router 280 are correlated through the topology table, FIGS. 3-8 are graphs that show different failure indicator scenarios detected for the embodiment described in FIG. 2. The BGP up or failure indicators are received from router 280 and the sub-interface up or failure indicators are received from switch 270. In this embodiment, the individual failure time window for a BGP failure indicator is fifty seconds and the concurrent failure time window is sixty seconds.

Figure 3:
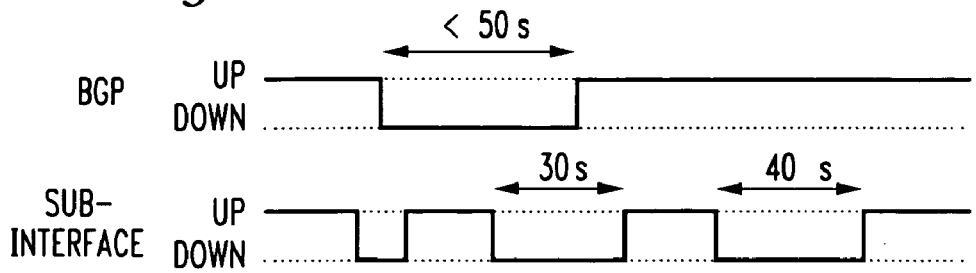
FIG. 3 is a graph of indicators generated by the system illustrated in the embodiment in FIG. 2.

FIG. 3 shows BGP and sub-interface failure indicators are received, but neither of the indicators are concurrently or individually down for longer than fifty seconds. In this case, no failure is reported for the router 280 because the failure indicator is shorter than the individual failure time window and the BGP and sub-interface failure indicators are concurrently shorter than the concurrent time window.

Figure 4:
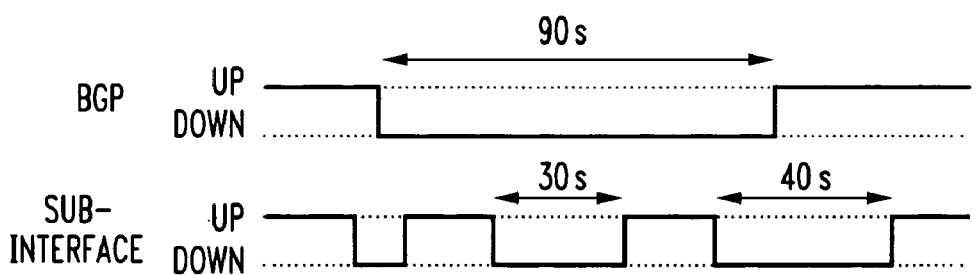
FIG. 4 is a graph of indicators generated by the system illustrated in the embodiment in FIG. 2.

FIG. 4 shows that the router 280 sends a BGP failure indicator with a duration of ninety seconds. The figure also shows sub-interface failure indicators are received, but all of the sub-interface failure indicators are forty seconds or shorter. The BGP down and sub-interface failure indicators overlap for a maximum of only thirty seconds, so a concurrent failure is not reported. But, the BGP failure indicator is sent by the router 280 and lasts for more than fifty seconds, so a router 280 BGP down failure is reported.

Figure 5:
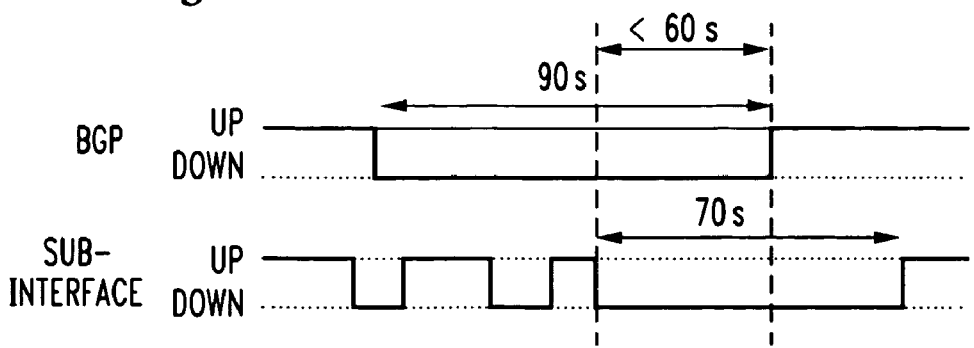
FIG. 5 is a graph of indicators generated by the system illustrated in the embodiment in FIG. 2.

FIG. 5 shows that both the duration of the BGP failure indicator and the duration of the sub-interface failure indicator are longer than fifty seconds, but the overlap between the two indicators is less than sixty seconds. In this case, a concurrent failure is not reported because the overlap between the BGP and sub-interface failures is less than sixty seconds. Only a router 280 BGP failure is reported. Although the sub-interface failure indicator is longer than seventy seconds, the layer 2 to layer 3 PVC failure on switch 270 is ignored since this embodiment targets the detection of router 280 BGP failures and router 280 BGP failures caused by layer 2 to layer 3 PVC failures on switch 270.

Figure 6:
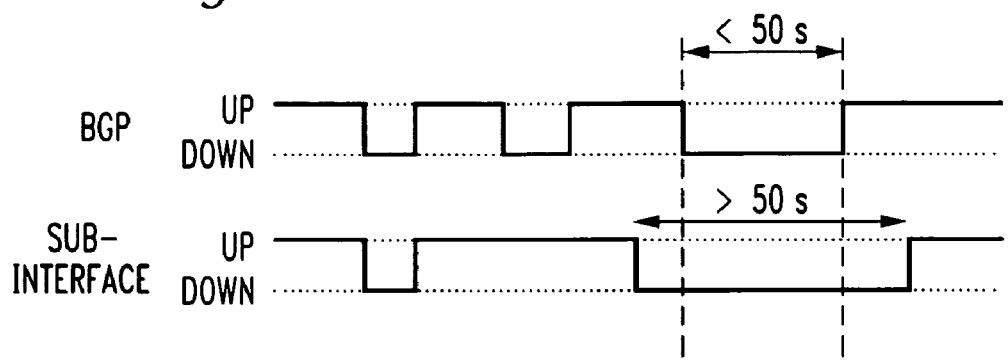
FIG. 6 is a graph of indicators generated by the system illustrated in the embodiment in FIG. 2.

FIG. 6 shows that the duration of the BGP failure indicator is less than fifty seconds and that the sub-interface failure indicator is greater than fifty seconds. The overlap between the two indicators is less than sixty seconds because the BGP failure indicator is less than fifty seconds in duration. No failures are reported in this scenario because the duration of the BGP failure indicator is less than fifty seconds and because the sub-interface failure indicator, although longer than fifty seconds, is ignored.

Figure 7:
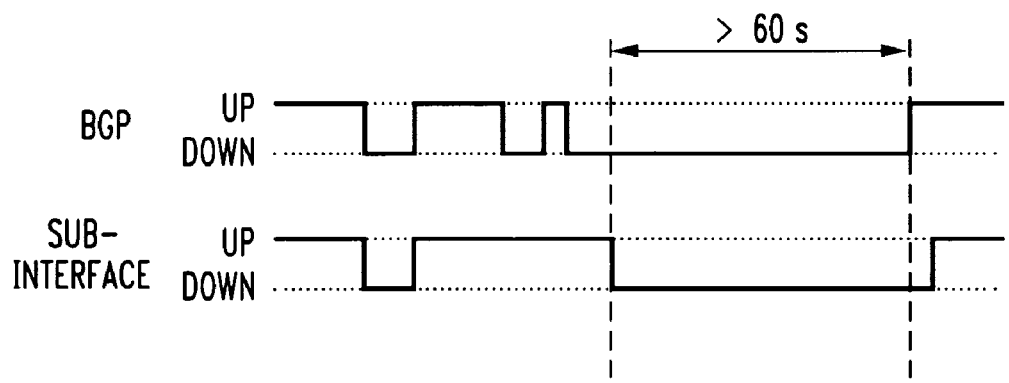
FIG. 7 is a graph of indicators generated by the system illustrated in the embodiment in FIG. 2.

FIG. 7 shows that the duration of the BGP failure indicator and the duration of the sub-interface failure indicator are greater than sixty seconds and that the overlap between the two indicators is greater than sixty seconds. Even though the individual failure indicators are greater than sixty seconds, the concurrent failure indicating that a layer 2 to layer 3 PVC failure on switch 270 is causing a router 280 BGP failure is preemptively reported and the individual switch 270 and router 280 failures are not reported.

Figure 8:
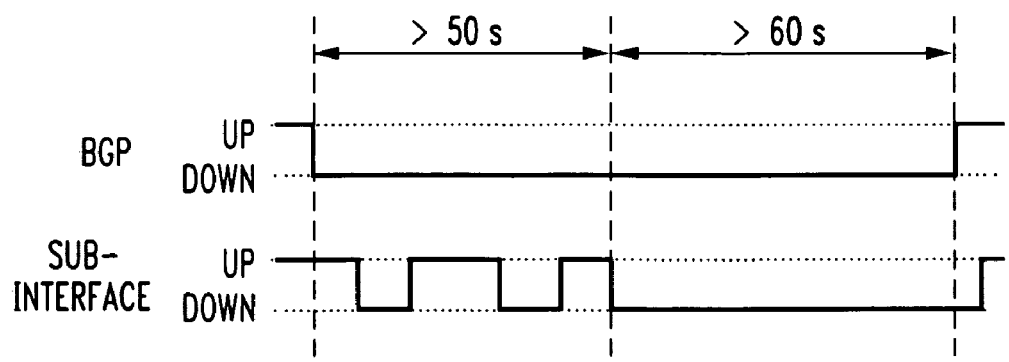
FIG. 8 is a graph of indicators generated by the system illustrated in the embodiment in FIG. 2.

FIG. 8 shows that the duration of a BGP failure indicator longer than fifty seconds is received. Subsequently, a sub-interface failure indicator that is concurrently down with the BGP failure indicator for more than sixty seconds is also received. In this case, both a router 280 BGP failure and a failure indicating that a layer 2 to layer 3 PVC failure on switch 270 is related to a router 280 BGP failure are reported. Although a concurrent failure is preemptively reported over individual failures, in this case, the router 280 BGP failure was reported before the concurrent failure was detected.

The method and apparatus described above automatically correlates indicators generated by network components to detect and isolate failures that are caused by or related to network components operating on different network layers.

This method and apparatus automatically detects concurrent failure indicators that are longer than a specified time window and correlates the concurrent failure indicators based on a topology table. While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents. While the invention has been particularly shown and described with reference to specific embodiments thereof, it will be understood that various changes in form and details may be made.

What is claimed is:

1. A method, comprising:
   receiving at least one indicator from a first network component indicating a failure of the first network component, the first network component being associated with a first network layer;
   receiving at least one indicator from a second network component indicating a failure of the second network component, the second network component being on a second network layer, the second network layer being different from the first network layer; and
   determining that the failure of the first network component and the failure of the second network component are related or unrelated based on a topology table and a duration of the at least one indicator from the first network component indicating the failure of the first network component and a duration of the at least one indicator from the second network component indicating the failure of the second network component with respect to a correlation time window.

2. The method of claim 1, wherein the at least one indicator from the first network component indicating a failure of the first network component and the at least one indicator from the second network component indicating the failure of the second network component are received from a single device integrating the first network component and the second network component.

3. The method of claim 1, further comprising generating a concurrent failure indicator indicating that the failure of the first network component and the failure of the second network component are related.

4. The method of claim 1, wherein the determining that the failure of the first network component and the failure of the second network component are unrelated includes using the topology table.

5. The method of claim 1, wherein the determining that the failure of the first network component and the failure of the second network component are unrelated includes determining that the duration of the at least one indicator from the first network component indicating the failure of the first network component and the duration of the at least one indicator from the second network component indicating the failure of the second network component are not concurrently for a time interval longer than said correlation time window.

6. The method of claim 1, further comprising determining that the duration of the at least one indicator from the first network component indicating the failure of the first network component is longer than a single device failure time window for the first network component.

7. The method of claim 1, further comprising generating a first network failure component indicator indicating that the duration of the at least one indicator from the first network component indicating the failure of the first network component is longer than a single device failure time window for the first network component.

8. The method of claim 1, further comprising determining that the duration of the at least one indicator from the second network component indicating the failure of the second network component is longer than a single device failure time window for the second network component.

9. The method of claim 1, further comprising generating a second network failure component indicator indicating that the duration of the at least one indicator from the second network component indicating the failure of the second network component is longer than a single device failure time window for the second network component.

10. An apparatus, comprising:
    an input configured to receive a plurality of indicators from a first network component, the first network component being associated with a first network layer and a plurality of indicators from a second network component, the second network component being on a second network layer, the second network layer being different from the first network layer; and
    a processor configured to receive the plurality of indicators from the first network component and the plurality of indicators from the second network component via the input and configured to associate at least one failure of the first network component and at least one failure of the second network component based on a topology table, the plurality of indicators from the first network component, the plurality of indicators from the second network component, and a correlation time window.

11. The apparatus of claim 10, wherein the processor is further configured to identify a failure of a single component based on a single failure time window, the single component being at least any one of the first network component and the second network component.

12. The apparatus of claim 10, further comprising an output configured to send at least any one of an indicator indicating that the failure of the first network component and the failure of the second network component are associated, an indicator indicating a first network component only failure, and an indicator indicating a second network component only failure.

13. A computer readable medium storing code representing instructions to cause a processor to perform a process, the code comprising code to:
    process at least one indicator from a first network component indicating a failure of the first network component, the first network component being associated with a first network layer;
    process at least one indicator from a second network component indicating a failure of the second network component, the second network component being on a second network layer, the second network layer being different from the first network layer; and
    determine that the failure of the first network component and the failure of the second network component are related or unrelated based on a topology table and a duration of the at least one indicator from the first network component indicating the failure of the first network component and a duration of the at least one indicator from the second network component indicating the failure of the second network component with respect to a correlation time window.

14. The computer readable medium of claim 13, wherein the at least one indicator from the first network component indicating a failure of the first network component and the at least one indicator from the second network component indicating the failure of the second network component are received from a single device integrating the first network component and the second network component.

15. The computer readable medium of claim 13, further comprising code to receive at least any one of at least one indicator from the first network component that does not indicate the failure of the first network component and at least one indicator from the second network component that does not indicate the failure of the second network component.

16. The computer readable medium of claim 13, further comprising code to determine at least any one of the duration of the at least one indicator from the first network component indicating the failure of the first network component is longer than a single device failure time window for the first network component and the duration of the at least one indicator from the second network component indicating the failure of the second network component is longer than a single device failure time window for the second network component.

17. The computer readable medium of claim 13, further comprising code to send at least any one of a first network failure component indicator indicating that the duration of the at least one indicator from the first network component indicating the failure of the first network component is longer than a single device failure time window for the first network component and a second network failure component indicator indicating that the duration of the at least one indicator from the second network component indicating the failure of the second network component is longer than a single device failure time window for the second network component.

* * * * *